United States Patent
Henry et al.

(10) Patent No.: US 6,580,790 B1
(45) Date of Patent: Jun. 17, 2003

(54) CALLING ASSISTANCE SYSTEM AND METHOD

(75) Inventors: Paul S. Henry, Holmdel, NJ (US); Hui Luo, Old Bridge, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/500,492

(22) Filed: Feb. 9, 2000

(51) Int. Cl.[7] .............................................. H04M 3/42
(52) U.S. Cl. ................................ 379/201.01; 379/88.25
(58) Field of Search ...................... 379/201.01, 201.11, 379/201.06, 201.07, 221.14, 196, 211.01, 88.22, 88.25

(56) References Cited

U.S. PATENT DOCUMENTS 5,995,976 A  * 11/1999  Walker et al. .............. 707/101
6,449,616 B1 *  9/2002  Walker et al. .............. 707/10

* cited by examiner

Primary Examiner—Creighton Smith

(57) ABSTRACT

A method for providing a called party's telephone number in response to some online identifying information provided by a calling party. The calling party provides an entire or at least a portion of an electronic mail address, screen name or login name belonging to the called party. The electronic mail address, screen name or login name is associated with the called party's telephone number. The number is provided to the calling party and the calling party may be connected to the called party directly via the telephone network.

21 Claims, 3 Drawing Sheets

CALLING ASSISTANCE SYSTEM AND METHOD

BACKGROUND OF THE INVENTION

The present invention relates to the field of telephony communications and more particularly to a system and method for determining a person's telephone number from some other identifying information, such as their electronic mail address, screen name or login name.

Over the past few years, there has been an explosive increase in the use of the Internet for communication, data transfer, research and recreation. Businesses, educational institutions, individuals, and governments are beginning to use the Internet for everything from personal communication to mission-critical commercial negotiations and transactions. Indeed, electronic mail is developing into a preferred alternative to the telephone, conventional paper mail service and facsimile transmission as a means to communicate. Electronic mail or e-mail addresses, in particular, make it easy for individuals to communicate since typically these e-mail addresses include at least a portion of a party's name thereby making these addresses much easier to remember as compared to conventional telephone numbers. Many people also like to use certain easy to remember online "screen names" or aliases which may reflect their interests, hobbies and/or beliefs. These "screen names" may be used in online chat rooms, discussion groups, instant messaging and newsgroups.

Unlike e-mail addresses, login names and screen names, conventional telephone numbers are not very easy to remember. A conventional telephone number is typically of the form XXX-YYY-YYYY where XXX designates the area code and YYY-YYYY designates the seven digit extension. While some phone numbers may actually "spell" a word or phrase when the numbers correspond to certain letters on a telephone keypad, for the most part, these telephone numbers are simply a collection of different unrelated numbers assigned to a called party by a telephone company or assigning authority. Furthermore, the recent increased usage of wireless phones and pagers has necessitated the creation of many new area codes has been necessitated, thereby even further making conventional telephone numbers difficult to remember.

Accordingly, it would be desirable to have an system which could provide the telephone number of an individual in response to their electronic mail address, screen name, login name or at lest a portion thereof.

SUMMARY OF THE INVENTION

The present invention is a system and method for assisting callers with obtaining another party's telephone number when the caller only knows the other party's online identifying information. This online identifying information may be an entire or at least a portion of the called party's electronic mail address, screen name or login name. The method of the present invention includes the steps of receiving, from the calling party, the called party's identifying information, the identifying information being at least a portion of the called party's online identifying information, determining the called party's telephone number from the online identifying information provided by the calling party and providing, to the calling party, the called party's telephone number.

The system of the present invention includes a component for receiving the called party's identifying information, wherein the called party's identifying information is at least a portion of the called party's online identifying information, a component for determining the called party's telephone number from the called party online identifying information provided by the calling party and a component for providing the called party's telephone number to the calling party. Additionally, a direct communication link may be established between the called party and the calling party, wherein the calling party may have access to the called party's home telephone, work telephone or voicemail.

The present system includes one or more databases which associate a called party's telephone number, with, for example, the called party's electronic mail address. The one or more databases may be searched using the information provided by the calling party to determine the called party's telephone number.

DETAILED DESCRIPTION OF THE INVENTION

Figure 1:
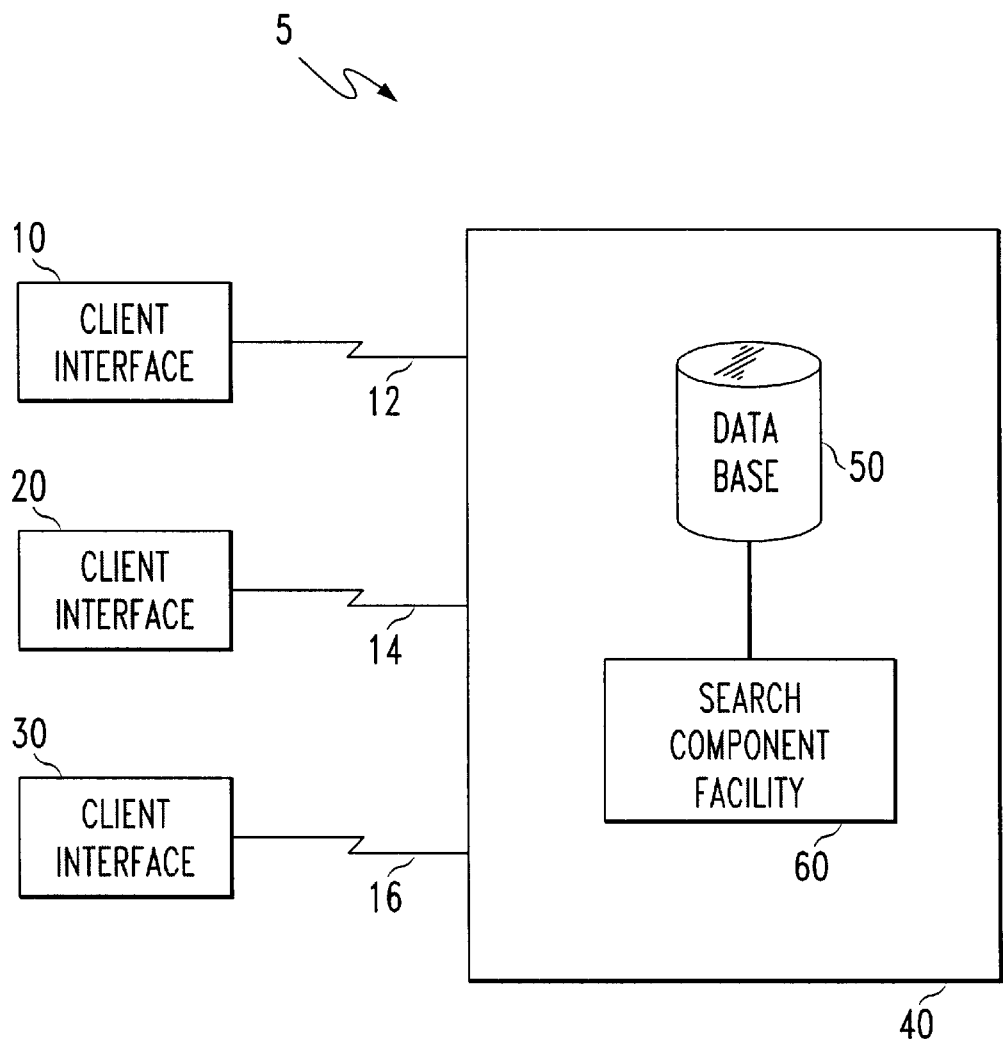
FIG. 1 illustrates a system in accordance with the teachings of the present invention.

Referring to FIG. 1, a system 5 of the present invention is shown which provides a party's telephone number in response to identifying information supplied about the party such as all or a portion of the party's electronic mail address, screen name, login name or other similar identifying information. The system 5 includes one or more client interfaces 10, 20 and 30 which communicate, respectively, via communications links 12, 22 and 32 with a communications server 40. In one embodiment of the present invention, the client interface is a telephone, such as a conventional telephony device for receiving and transmitting voice communications which may be connected to the local network via a dedicated subscriber line. Alternatively, the telephone may be any form of wireless telephone connected to the local network through an intermediate wireless network, such as a cellular telephone network. The client interface may also use a computer, palmtop device or other device with which to communicate with the communications server 40.

In a preferred embodiment, the communications server 40 includes a database 50 and a search component facility 60. Although the database 50 is shown as a single database, it may be a combination of two or more databases, either external or internal, which contains a series of associated telephones numbers and electronic mail addresses, login names or screen names.

As used herein, the term "online identifying information" refers to an entire or at least a portion of a party's electronic mail address, screen name, login name or other identifier a party may use to identify themselves online, such as in a chatroom, online service, electronic mail, instant message, etc. Typically, the electronic mail address will be of the form: "name@host.com" where "name" is the user's online "handle" and "host.com" identifies the system hosting the electronic mail account. Screen names and login names typically are a combination of letters and numbers ranging generally from four characters to twenty characters.

In the present invention, a first party or "calling party" 20 desires to initiate communication with a second party or "called party", but does not know or remember the called party's telephone number. Notwithstanding the fact that the calling party does not know or remember the called party's telephone number, the calling party initiates a communication with communications server 40 by providing some identifying indicia or information, such as the electronic mail address of the called party, to the communications server through the appropriate client interface, such as a telephone. In response to the information provided by the calling party, the communications server will provide the called party's telephone number to the calling party.

Figure 2:
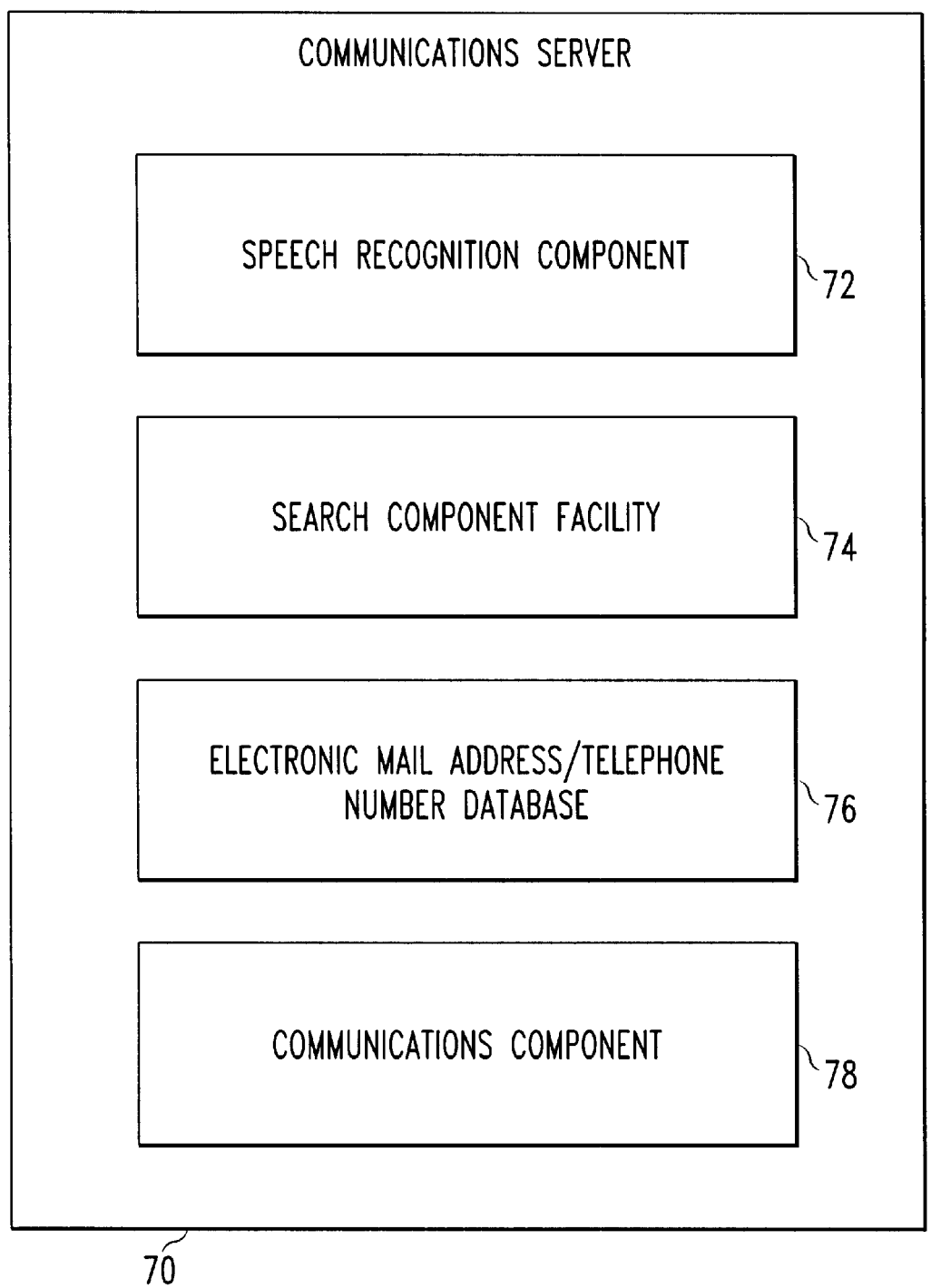
FIG. 2 illustrates an exemplary system server for use in accordance with the teachings of the present invention.

Referring to FIG. 2, a more detailed view of the communications server is shown. The communications server 70 preferably includes an input component, such as a speech recognition component 72, a search component facility 76, an electronic mail address/telephone number database 76, and a communications component 78. The electronic mail address/telephone number database 76 may easily be modified to contain login name, screen name or other identifying information which is associated with a called party's telephone number. Through a client interface, such as a telephone, a user or calling party will initiate a communication with the communications server 70, for example, by dialing a dedicated number which contacts the communications server 70. This dedicated number may be a toll free number such as a "1-800" or "1-888" number or a toll call such as through a "1-900" number. Alternatively, the dedicated number may also be integrated into a Private Branch eXchange (PBX) system within a specific organization.

In the present invention, this dedicated number will connect the calling party with the communications server 40. The communications server 40 will prompt the calling party to provide the desired called party's online identifying information, such as all or a portion of the called party's electronic mail address, screen name or login name. The speech recognition component 72 analyzes the speech signals from the calling party and passes the called party's identifying information, such an electronic mail address to the search component facility 74. The search component facility 74 performs a query upon the electronic mail address/telephone number database 76 to determine if an entry exists in the database 76 which matches the identifying information provided by the calling party. In this example, the search component facility 74 will be querying for the electronic mail address provided by the calling party. If a match in the database is found, communication component 78 may establish a communications link with the calling party and the called party.

In an exemplary embodiment, the speech recognition component employs standard automatic speech recognition (ASR) or simply, speech to text, techniques to derive text from recorded speech, i.e. to identify the letters or words spoken by the calling party. In the present invention, ASR is used to analyze the speech signals provided by the calling party to produce a representation of the calling party's speech signal. In an exemplary embodiment, such speech recognition techniques may use a combination of pattern recognition and sophisticated guessing based on some linguistic and contextual knowledge to transcribe the speech. It is contemplated that other methodologies and techniques may be used so long as the speech is properly transcribed into a format for use by the communications server to conduct a search within the database as discussed above.

In the present invention, one or more of the communications server components, and/or the entire communications server itself may be implemented on a computer system. The computer system will typically include a communications processing unit (CPU), memory and storage facilities and a number of input/output devices. The CPU has access to a storage facility which, for example, may contain the called party identifying information/telephone number database. In another embodiment, the databases may be remotely located and accessible from the server system. For example, telephone number records may be located at a repository at a local telephone company or exchange and electronic e-mail address information may be remotely located on an electronic mail server or hub. The computer system may also include a network adapter for connecting the CPU with the network. The computer system may additionally include a modem and an audio output device (such as a loudspeaker) for generating audio output. The computer preferably has a display and a pointing device, such as a mouse, trackball, joystick, etc. for controlling the movements of a cursor across the display. The computer also includes a keyboard or other similar input device.

The system of the present invention is adaptable to a variety of network configurations. In one embodiment, the system is localized, for example, to a calling party's personal computer. Preferably, the present system operates in a more centralized configuration where a number of remote clients are in communication with one or more centralized communications servers, which in turn, are in communication with a centralized telephony system.

Figure 3:
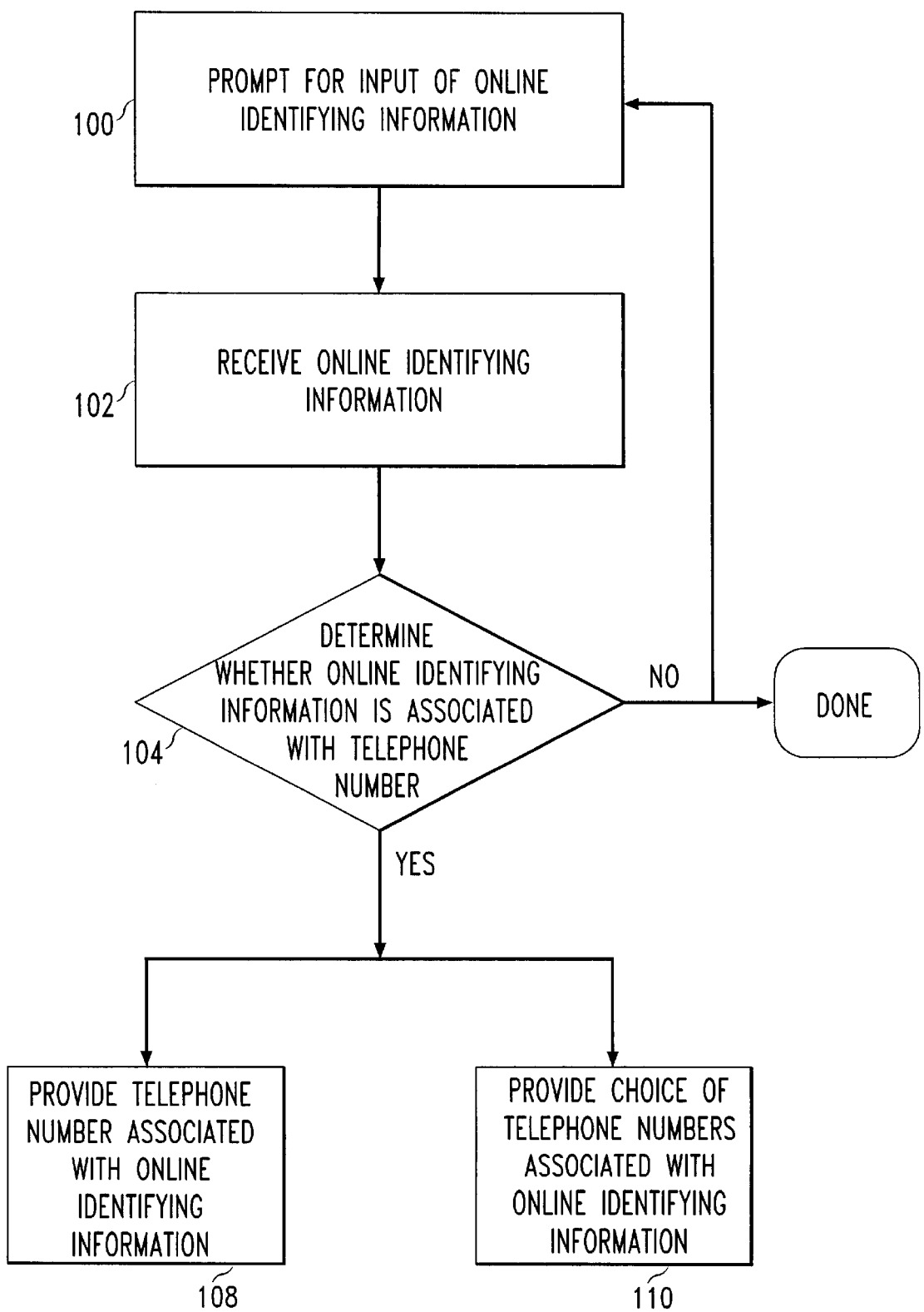
FIG. 3 is a flow chart which illustrates a method in accordance with the teachings of the present invention.

An exemplary process for providing telephone numbers in accordance with the teachings of the present invention is shown in FIG. 3. As shown, the system prompts for input of the called party's online identifying information, step 100, such as an electronic mail address, screen name or login name. The system receives the online identifying information from the calling party, step 102. It is important to note that the entire or complete electronic mail, screen name or login name of the called party does not have to be provided by the calling party. For example, if the calling party can only remember the first or "name" portion of an electronic mail address and does not remember the "@host.com" portion, the calling party may simply provide only the "name" portion to the system. Any portion of an entire electronic mail address, login name or screen name may be provided so long as the system has sufficient information to conduct a search on the database, as discussed earlier herein.

Once the system receives the called party's identifying information from the calling party, the system determines whether the called party's identifying information is associated with a telephone number in the system database, step 104. This is accomplished by performing a query upon the system database to see if the called party's identifying information matches any entries in the system database which contains telephone numbers associated with specific online identifying information. If no valid matches are made for the identifying information in the databases, the transaction either ends or alternatively, the system may prompt again for input of some identifying information, step 100. If one valid match is found in the database for the identifying information, the system provides to the calling party the called party's telephone number, step 108. If two or more matches are found in the database for the identifying information provided by the calling party, the system provides a choice of the matching telephone numbers for the calling party to choose from. Such a choice may be provided via an associated Interactive Voice Response Unit where, for example, the calling party may press a number key on the telephone to select a certain selection from the matching choices.

In addition to the voice recognition capability as discussed herein, the calling party may provide the called party's identifying information to the system in a number of other manners. In one embodiment of the present invention, the calling party uses an input component or client interface, such as a telephone keypad, to provide the system the called party's online identifying information. This may be done, in one embodiment, by "spelling out" the called party's identifying information on the telephone keypad. For example, the calling party may accomplish this by pressing the telephone keypad keys in the order in which the keys contain the appropriate letter and number of the called party's online identifying information. In the case of letters, the calling party may first press the button which corresponds to one of the letters, e.g. by selecting the button "2" which corresponds to the letters "ABC" and then pressing the position number of the letter on the button, e.g. if the letter "C" is desired, the calling party would then press the number "3". In other embodiments where the online identifying information may be a combination of letters and numbers, the calling party may have to press a number, such as "0" or "1" to indicate that a number, instead of a letter is going to be selected.

For special characters such as the "@"(at sign), "-" (hyphen) or "."(period), the calling party may be required to spell out the symbol such as "at" for @ and "hyphen" for "-". The end of an entry may be by pressing the "#" or speaking the word "end" into the telephone. In alternative embodiments, the telephone will have a keyboard with separate keys for the entire alphabet and associated characters such as "@", "-" and "," through which the calling party may easily input the online identifying information. The input from the keyboard may then be translated into a set of tone sequences which may be processed by a telephone system, as discussed above.

In the present invention, the calling party may be billed for using the system in a number of manners. For example, as discussed earlier herein, the calling party may use a dedicated telephone number to access the system, such as a "1-900" number which will then be billed on the calling party's regular telephone bill. The system may also prompt the calling party to provide a credit card, debit card or other account to which a charge may be levied. The system may also be provided as a free service on a value added basis to a subscriber, such as the calling party.

To protect the identity of parties in the system, any potential called party will have the option of "blocking" their telephone number from the system. In this case, if a called party has "blocked" their telephone number, a calling party cannot access the called party's telephone number even if the calling party correctly provides the called party's online identifying information, such as their electronic mail address. Alternatively, any called party may have the option of specifying a specific phone number, such as their work telephone number or a number which goes directly into voicemail for use by the system. In this manner, the identifying information, such as the electronic mail address, of the called party will be only associated with the telephone number specified by the called party in the system database.

As used herein, the public switched telephone network may be a telephone network provided by a local exchange carrier such as one of the Regional Bell Operating Companies or it may be a telephone network provided by a long distance carrier such as AT&T. Another example of a public switched telephone network is the combined network provided by a local exchange carrier and a long distance carrier. The network may be either electrically or optically based or may involve combinations of those two technologies. The network may be digital or analog. Two examples of suitable digital networks are a packet network and a frame relay network, such as the existing packet and frame relay networks now provided by carriers such as AT&T.

It will be apparent to those skilled in the art that many changes and substitutions can be made to the system and method described herein without departing from the spirit and scope of the invention as defined by the appended claims.

We claim:

1. A method for providing a called party's telephone number in response to identifying information provided about the called party by a calling party, the method comprising the steps of:
   receiving, from the calling party, the called party's identifying information, the identifying information being at least a portion of the called party's online identifying information;
   determining the called party's telephone number from the online identifying information provided by the calling party; and
   providing, to the calling party, the called party's telephone number.

2. The method of claim 1, wherein the called party's online identifying information is received from a telephone keypad input.

3. The method of claim 2, wherein the called party's identifying information is the called party's electronic mail address.

4. The method of claim 1, wherein the called party's identifying information is at least a portion of the called party's screen name.

5. The method of claim 1, wherein the step of receiving, from the calling party, the called party's identifying information, is via a telephone interactive voice response unit.

6. The method of claim 4, wherein the called party's online identifying information are received as speech.

7. The method of claim 1, wherein the step of determining the called party's telephone number from the called party's online identifying information includes the step of searching a database which contains a plurality of electronic mail addresses associated with a plurality of telephone numbers.

8. The method of claim 1, wherein the step of providing, to the calling party, the called party's telephone number includes the step of establishing a telephone communication between the called party and the calling party.

9. The method of claim 1, further comprising the step of:
   associating a plurality of called party's online identifying information with a plurality of telephone numbers.

10. The method of claim 1, further comprising the step of:
    connecting the calling party to the called party's voice mailbox.

11. A system for providing a called party's telephone number to one or more calling parties, comprising:
    means for receiving the called party's identifying information, wherein the called party's identifying information is at least a portion of the called party's online identifying information;
    means for determining the called party's telephone from the called party's online identifying information provided by the calling party; and
    means for providing the called party's telephone number to the calling party.

12. The system of claim 11, further comprising the step of:
    means for associating a plurality of called party identifying information with a plurality of telephone numbers associated with each respective called party.

13. The system of claim 11, wherein the called party's online identifying information is at least a portion of an electronic mail address used by the called party.

14. The system of claim 11, wherein the called party online identifying information is a screen name used by the called party.

15. The system of claim 11, wherein the called party's online identifying information is a login name used by the called party.

16. The system of claim 11, further comprising:

means for providing the called party's identifying information, wherein the means for providing the called party's identifying information includes a telephone keypad.

17. The system of claim 11, wherein the means for receiving the called party's identifying information includes a speech recognition component.

18. A method for determining a called party's telephone number from online identifying information provided by a calling party, the method comprising the steps of:

receiving at least a portion of some online identifying information about the called party;

determining what telephone number corresponds to the called party's online identifying information; and providing the called party's telephone number to the calling party.

19. The method of claim 18, further comprising the step of:

establishing a communication link between the parties.

20. The method of claim 18, wherein the online identifying information is at least a portion of one of an electronic mail address, a screen name and a login name.

21. The method of claim 18, wherein the online identifying information about the called party is provided via a telephone keypad.

\* \* \* \* \*